United States Patent Office 3,085,076
Patented Apr. 9, 1963

3,085,076
HEAT CURABLE COMPOSITION COMPRISING A LATEX OF A CARBOXYLATED DIENE POLYMER, PRIMARY METAL DRIER, AND A SECONDARY CURING AGENT AND A LATEX PAINT THEREOF
Carl A. Zimmerman, Dover, Del., assignor to International Latex Corporation, Dover, Del., a corporation of Delaware
No Drawing. Filed Oct. 15, 1959, Ser. No. 846,567
9 Claims. (Cl. 260—29.7)

This invention relates to diene polymer latexes and to water paints made from these latexes. More particularly, the invention relates to carboxylated diene copolymer latexes and catalyst compositions for improved heat curing of the latex films. The invention also relates to heat cured latex and latex paint films having improved properties and processes for their production.

For purposes of the invention, "latex" shall mean a water dispersion comprising polymer or copolymer particles, and "latex film" shall mean film formed by coalescence of the particles upon removal of the water from the latex.

The invention is described particularly in connection with carboxylated conjugated diene polymer latexes and latex paints for use as baked industrial finishes on metal substrates, both ferrous and non-ferrous. These latexes are, however, advantageously applicable as clear or pigmented protective coatings to many surfaces such as wood, glass, plastic, and any other substrates to which the latex film is adherent, and also are suitable as thermosetting adhesives for bonding similar or dissimilar materials, e.g. laminated wood.

For films sufficiently hard to serve as baked primer or enamel finishes, the carboxylated diene polymers most suitable for the latexes are the resinous or non-rubbery type. They are derived, for example, by copolymerization of a minor proportion (less than 50% by weight) of a conjugated diene with a major proportion (greater than 50%) of a copolymerizable monoolefinic monomer and having a carboxyl group content by inclusion of a polymerizable carboxylic acid monomer in the monomer mixture, or by formation of carboxylic groups in the copolymer after polymerization.

Latex paints have several real advantages over organic solvent paints in the field of baked industrial finishes. They are non-inflammable and non-toxic. This eliminates fire and toxicity hazards, and reduces costs by dispensing with the need for expensive ventilation and solvent recovery systems. In spite of these potential advantages, water-thinned latex paints have not come into appreciable use as industrial finishes because the films are generally lacking in one or more desired properties, e.g. hardness, water resistance, and color stability. Also in certain instances there are substrate corrosion problems.

More recently, cobalt and manganese driers have been suggested as cure catalysts for baked latex films, but problems have been encountered with stability of the latex and discoloration in the cured film. These metallic driers added in water soluble or dispersible salt form, e.g. acetates or naphthenates, in the amounts required to produce tack-free films cause a darkening or yellowing of the baked latex film. This darkening is noticeable at metal contents as low as 0.02% based on latex solids, while up to five times this quantity of cobalt, the most active drier, is required for tack-free cure. The discoloration or darkening of the dried film attributable to these catalysts militates against the use of these latexes as clear coatings and in the formulation of white and light-colored paints. Where steel substrates are involved, it has been recognized that the iron of the substrate acts as a drier or catalyst for accelerating the latex cure. However, this requires an acid pH for the latex and iron staining of the film is encountered. With alkaline latexes, the quantities of manganese and cobalt drier added for effective cure tend to make the latex unstable, and require additional stabilizer which lowers the water resistance of the cured latex film.

The present invention provides particular diene copolymer latexes heat curable to tack-free films at greatly reduced drier metal content thereby substantially eliminating discoloration due to the metal drier. The cured films are tough and durable, and exhibit good adhesion, hardness, and water and chemical resistance. It also advantageously provides new primary metal driers for the latex films, in addition to cobalt and manganese, and further provides a more advantageous form for the metal drier permitting it to be "built-in" to the latex.

It was observed that when latexes of conjugated diene copolymers containing carboxyl groups were used, certain metals supplement or augment the cure provided by the primary metal drier. These metals are called "secondary curing agents" to distinguish them from the primary metal driers. The reduction in quantity of primary metal drier required to produce a cured tack-free film is at least tenfold, and provides films without the objectionable discoloration due to the larger quantities of primary metal drier. The metals which have been found effective as secondary curing agents include zinc, magnesium, zirconium, cadmium, strontium and nickel or mixtures thereof.

It was also discovered that other metals, namely, iron, copper and vanadium, in addition to cobalt and manganese were effective as primary metal driers in the heat curing or the thermosetting of the latex films and particularly when used in chelated form. The metal may be chelated simply by reaction of a water soluble salt of the metal with a suitable water soluble chelating agent, or in any other suitable manner known to those skilled in the art. By chelation of the primary metal drier considerably reduced quantities provide tack-free films compared to water soluble and water dispersible salt forms, e.g. acetates, naphthenates, sulfates, chlorides, etc. However, the water soluble and water dispersible salt forms of the primary driers may be used while still obtaining the advantage of drier reduction due to the carboxylic nature of the polymer. The chelated metal is preferably added to the latex after polymerization, but may be added to the polymerization recipe. When the drier metal is a water soluble salt, it is preferably added to the polymerization recipe, because when added to the latex after polymerization it tends to make the latex unstable. Another decided advantage of the chelated form of drier is the stability of the latex evidenced by marked reduction in formation of floc in the latex when the metal drier is introduced in chelated form.

With certain metals, iron, vanadium, and copper, polymerization is inhibited or retarded and these drier metals in salt form must be introduced after polymerization. This is a further advantage for the chelated metal which may be introduced in the required quantities either before or after polymerization.

Any water soluble or dispersible chelating agents may be employed for the purpose of the invention. The amino polycarboxylic acid type is at present preferred, for example, the commercially available ethylenediaminetetraacetic acid, or its sodium salt, and N-hydroxyethyl ethylenediaminetriacetic acid or its sodium salt. Other metal chelating compounds, e.g. amines and amino-carboxylic acids are suitable, particularly those which are bi and polydentate coordinators.

Thus, to obtain all advantages of the invention, the latex compositions should be the non-rubbery, resinous carboxylic-diene copolymer type with a secondary curing agent and with the primary metal drier in chelated form. However, the acid polymer may be used to advantage with or without the metal drier chelated.

The diene-carboxylic acid copolymers suitable for the latexes are any which have a plurality of carboxyl groups in the molecule, either free acid or neutralized, e.g. with ammonia or alkali metal. As above stated, those copolymers in which the diene monomer proportion is less than 50% are preferred to provide resinous rather than rubbery properties. The carboxylic copolymers may be prepared by aqueous emulsion polymerization of a suitable diene, e.g. butadiene 1,3, and any carboxylic acid copolymerizable with the diene as more fully described in Patent No. 2,880,186, or by alternative methods described in Patent No. 2,724,707. Where prepared directly from a diene and a carboxylic acid monomer, a third comonomer is preferred and for specific application to baked finishes, styrene is the preferred comonomer. Any of those acids mentioned in the patents referred to are suitable, although methacrylic is the most common and more readily available.

The resulting acid latices are usually made alkaline, for example, by neutralization of the acidic latex with ammonia or other suitable volatile neutralizing agents, e.g. amine salts. However, the invention is applicable to latexes of acid as well as alkaline pH.

The primary metal driers when chelated and added to the acid latex provide tack-free cured latex films of satisfactory hardness at quantities as low as .004% (parts of metal per hundred parts of latex solids) when the secondary curing agent is present. Without chelation, the same result is obtainable at quantities as low as .01%. Properties of the film are not benefitted at quantities over 0.015% metal drier and these lower quantities favor no discoloration due to the drier. The quantities given above are for a heat curing cycle of 15 minutes at 300° F., and will vary slightly with the time and temperature. However, the differences in quantities will remain substantially the same.

The secondary curing agent is added as a soluble salt, preferably to the polymerization recipe, although it may be added after without ill-effect on latex stability, since the neutralized acid latex has a "built in" stabilizer, i.e. the hydrophilic carboxylate groups. It is used in total quantities which are effective to augment the latex cure and reduce primary metal drier requirements, for example, as little as .05% to 0.15% of the salt based on latex solids. This may be from 0.01 to 0.1% metal based on latex solids depending on the particular metal and salt. Amounts exceeding these may be used, but do not appear necessary for good curing, and increase in metal salt addition to the recipe or to the latex is desirably avoided. Zinc is preferred both for economy and efficiency, while acetate is the preferred salt form, although sulfate, nitrates, chlorides and other inorganic and organic anion forms may be employed.

The latices prepared as described may be used to provide clear films or may be pigmented and then cured with the metal driers of the invention under normal curing cycles, for example, 15 to 30 minutes at 250° F. to 350° F.

Typical paint pigments of both the inorganic and organic type are titanium dioxide (preferably rutile), and lithopone for white hiding pigments, clays, silica, mica and barytes as extender pigments; and color pigments, e.g. iron oxide, chromium oxide hydrate, cadmium red, and other cadmium colors, and colored organic pigments, such as carbon black, phthalocyanines, naphthol red, toluidine red, and many others. The pigment is usually prepared in water dispersion form utilizing well-known pigment dispersing agents, and then added to the latex. Pigment dispersing or wetting agents among which may be mentioned are sulfonates of the aliphatic, aromatic or alkyl-aryl type, long chain aliphatic sulfates, and other anionic emulsifiers; polyethers and ether-alcohol condensates and other non-ionic emulsifiers, and compatible hydrophilic colloidal dispersing agents or protective colloids. Under proper conditions, certain of the pigments may be added in finely divided solid form to the latex without causing coagulation. Commercial defoamers may be added to the latex to prevent undue foaming when the pigment is incorporated under mechanical agitation and when the paint is in use.

The latexes are compatible with various synthetic colloidal thickeners, for example, methylcellulose and carboxymethylcellulose. Such thickeners may be incorporated in the paint formulations to provide desired flow properties. These substances may be used either singularly or in combination.

The invention and its advantages are described in greater detail in conjunction with the following examples which includes a specific embodiment thereof. The tests for the measurements given in the data below were conducted as follows:

Latexes were prepared and compounded with driers and secondary curing agents as indicated below. The latexes were then coated onto aluminum test panels as clear or pigmented films and baked for 15 minutes at 300° F.

The cure of the latex film was determined by a tack test performed as follows:

A cotton ball is placed on the latex coating after baking. A steel panel similar in size to the test panel is placed over the cotton ball and a two (2) kilogram weight is placed on the steel panel and centered over the cotton ball so that the panels are not in contact. After ten (10) minutes, the cotton ball is removed. A tack-free surface will have no cotton adhering while a tacky surface will have varying amounts of cotton adhering depending on the degree of tackiness.

The color test on white pigmented films were performed visually with number ratings assigned 1, 2, 3, etc., the number increasing with "off-whiteness" of the sample as compared to a standard or control white. These number ratings correspond to the following values on a Hunter color meter:

| Color rating | $R_d$ | $a$ | $b$ | L |
| --- | --- | --- | --- | --- |
| True Standard | 81.8 | −1.3 | +0.3 | 90.4 |
| No. 1 | 82.6 | −1.2 | +2.5 | 90.8 |
| No. 2 | 74.6 | −1.7 | +7.7 | 86.2 |
| No. 3 | 74.4 | −2.3 | +9.2 | 86.1 |
| No. 4 | 71.6 | −2.6 | +12.3 | 84.5 |
| No. 5 | 70.4 | −2.3 | +14.0 | 83.7 |
| No. 6 | 53.7 | −3.2 | +14.0 | 73.0 |
| No. 7 | 50.4 | +2.3 | +14.4 | 70.8 |
| No. 8 | 40.7 | +5.5 | +14.4 | 63.4 |

This meter operates as a reflectometer and measurement is made of the light reflected from the "white" sample surfaces. Samples darkened by discoloration absorb more light and reflect less than the undiscolored samples.

The significance of the data, including the meaning of $R_d$, $a$, $b$, and L is set forth in the following publication: Physical and Chemical Examination of Paints, Varnishes, Lacquers and Colors, 11th edition, 1950, by Henry A. Gardner and G. G. Sward, distributed by Henry A. Gardner Laboratory, Inc. See pages 65A and 65B explaining color and color difference meter, type C and also page 70.

Hardness where reported is measured by the Sward hardness rocker test.

EXAMPLE I 40 parts liquid butadiene, 57 parts styrene and 3 parts methacrylic acid is polymerized in 120 parts of water at 50° C. in the presence of 2 parts sodium alkylaryl sulfonate emulsifier 0.15 part potassium persulfate, 0.5 part mixed tertiary $C_{12}$ to $C_{16}$ mercaptans and .02 part ethylenediaminetetraacetic acid. After polymerization to 95% conversion, the acid latex was neutralized to pH 7.5 with ammonia and after vacuum stripping contained 48% of total solids.

The polymer latex is then ready for addition of the primary metal drier except where it is added beforehand to the polymerization recipe. The latex may be stabilized by addition of one part of a non-ionic stabilizer, e.g. nonylphenoxy substituted polyethylene oxide (Igepal CO 880).

Where a secondary curing agent is to be used, it is added to the polymerization recipe and there acts advantageously as an electrolyte to reduce viscosity before it enters into the curing mechanism.

The following table of comparative tests illustrates the advantage of the invention regarding the acid polymer, the secondary curing agent and the chelated form of primary drier, both in their individual capacities and in combination. The amount of primary drier is given as the approximate minimum for obtaining a tack-free film as tested by the "cotton ball" tack test described above.

The chelating agent was trisodium N-hydroxyethyl ethylenediaminetriacetate and is indicated as "chelate."

The abbreviations are as follows:

BD=butadiene
MAA=methacrylic acid
MMA=methylmethacrylate
ST=styrene
Ac=acetate and the amounts given under each is the monomer charge (except under Ac).

the results of the following tests in which aluminum panels were coated with white enamels made up as indicated below. It was intended to compare an acid curing agent with polymer latex film having a chelated drier and secondary curing agent with a nonacid polymer film having a conventional naphthenate drier, each in recommended amounts. However, the butadiene-styrene copolymer latex unduly increased in viscosity upon pigment addition due perhaps to pigment shock. This term merely indicates the effect of the finely ground pigment particles which tend to destabilize the latex. Therefore, an acid latex was substituted, since the carboxylate groups in the polymer permit more pigment addition without instability. This does not cloud the results which show the advantage of the invention in avoiding discoloration.

The paint formulation is as follows:

| Pigment dispersion: | Pounds/gallon |
|---|---|
| Titanium dioxide (Ti pure R-100, Du Pont) | 155.0 |
| Dispersing agent (25% solution of a sodium salt of low molecular weight polycarboxylic acid—Tamol 731, Rohm & Haas) | 4.7 |
| Tributyl phosphate (defoamer) | 0.5 |
| Water | 59.8 |

Ground approximately 16 hours in pebble mill to a fineness of 7–8 North standard scale, which is a particle size between 0.5 and 0 mil.

*Table I*

PRIMARY METAL DRIER LEVEL

| Latex polymer | Primary metal drier | | Secondary curing agent [1] | | Cure [2] | Hardness |
|---|---|---|---|---|---|---|
| | Form | Amount [3] | Form | Amount [3] | | |
| 1. BD/ST/MAA 40/57/3 | Cu and Fe chelate, equal wts | .004 | ZnAc | 0.04 | Tackfree | 13 |
| 2. BD/ST 40/60 | Co naphthenate | >0.05 to 0.1 | | | do | |
| 3. BD/ST 40/60 | Mn naphthenate | 0.05 to 0.1 | | | do | |
| 4. BD/ST/MAA 40/57/3 | Cu and Fe chelate, equal wts | 0.03 | | | do | 10 |
| 5. BD/ST 40/60 | do | 0.04 | | | do | 10 |
| 6. BD/ST 40/60 | Co chelate | 0.06 | | | do | 18 |
| 7a. BD/ST/MAA 40/57/3 | Co naphthenate | 0.008 | ZnAc | 0.04 | Very slight tack | |
| 7b. BD/ST/MAA 40/57/3 | do | 0.012 | ZnAc | 0.04 | Tackfree | |

[1] Added to polymerization recipe.
[2] By cotton ball tack test, all panels baked 15 minutes at 300° F.
[3] Parts metal by weight of latex solids.

In Table II, are tests showing variations in primary drier and secondary curing agent.

*Table II*

| Test polymer | Primary metal drier | | Secondary curing agent | | Cure | Hardness |
|---|---|---|---|---|---|---|
| | Form | Amount | Form | Amount | | |
| 1. BD/MMA/MAA 40/57/3 | Cu and Fe [a] chelate | .01 | ZnAc [b] | .04 | Tackfree | |
| 2. BD/ST/MAA 32/65/3 | do [a] | .01 | ZnAc [b] | .04 | do | |
| 3. BD/ST/MAA 40/57/3 | FeCl₃ [a] | .03 | | | do | 15 |
| 4. BD/ST/MAA 40/57/3 | V chelate | .014 | | | do | 16 |
| 5. BD/ST/MAA 40/57/3 | VOSO₄ [a] | .03 | | | do | 18 |
| 6. BD/ST/MAA 40/57/3 | Cu chelate [a] | .014 | | | do | 24 |
| 7. BD/ST/MAA 40/57/3 | CuSO₄ [a] | .04 | | | do | 12 |
| 8. BD/ST/MAA 40/57/3 | Fe chelate [a] | .014 | MgCl₂ [b] | .025 | do | |
| 9. BD/ST/MAA 40/57/3 | do [a] | .014 | ZrAc [b] | .04 | do | |
| 10. BD/ST/MAA 40/57/3 | do [a] | .014 | CdAc [b] | .05 | do | |
| 11. BD/ST/MAA 40/57/3 | do [a] | .014 | NiSO₄ [b] (NH₄)₂SO₄ | .02 | do | |

[a] Added to latex after polymerization.
[b] Added to polymerization recipe.

Thus, it may be seen that the chelated form of primary metal drier provides greater curing power with or without a secondary curing agent, although advantageously small quantities of the new primary driers may be used in soluble salt form to obtain satisfactory cure. The further advantage of chelation is that iron, copper and vanadium inhibit polymerization when added to the recipe in uncomplexed form.

The pronounced color advantage of the invention in lesser discoloration of white pigmented paints is shown in

| Letdown: | Pounds/gallon |
|---|---|
| Pigment dispersion | 220 |
| Latex BD/ST/MAA 40/57/3—46% solids | 732 |
| Methyl cellulose—15 c.p.s. (5%) | 10 |
| Morpholine (25% solution—amine stabilizer and anticorrosive) | 3 |

Coated panels were baked 15 minutes at 300° F. to cure the latex films and the color was tested after baking.

Table III
DISCOLORATION—WHITE PRIMER

| Polymer | Primary metal drier [1] | | Secondary curing agent [2] | | Color rating |
|---|---|---|---|---|---|
| | Form | Amount | Form | Amount | |
| 1. BD/ST/MAA 40/57/3 | Fe and Cu chelate | .01 | ZnAc | 0.04 | 3 |
| 2. BD/ST/MAA 40/57/3 | Co chelate | .01 | ZnAc | .04 | 2 |
| 3. BD/ST/MAA 40/57/3 | Mn chelate | .01 | ZnAc | .04 | 4 |
| 4. BD/ST/MAA 40/57/3 | Co naphthenate | [3] 0.1 | ZnAc | .04 | 6 |
| 5. BD/ST/MAA 40/57/3 | Mn naphthenate | [3] 0.1 | ZnAc | .04 | 6 |

[1] Added to latex.
[2] Added to polymerization recipe.
[3] Recommended amounts for non-carboxylic polymer for proper cure.

The color ratings 2 to 4 are white, and markedly different from the almost tan color of rating 6. The number rating is nonlinear when calibrated against the Hunter meter.

The invention is not to be regarded as limited to the specific polymers contained in the examples, or even to non-rubbery, resinous polymers. The curing system is applicable to other carboxylated diene copolymers in which the diene is the predominant comonomer. Suitable dienes for preparation of the latices of the invention are exemplified by the following: butadiene-1,3, isoprene, 2,3-dimethyl butadiene-1,3, piperylene, 2 chloro butadiene-1,3, and corresponding mono and di halogen-substituted butadienes. As the copolymerizable olefinic comonomer, the following examples are representative: The aromatic compounds, for example, styrene, vinyl toluene, divinyl benzene, the nuclearly substituted styrenes such as the chlorostyrenes and alkyl styrenes, alpha-chlorostyrene, alpha-methylstyrene, vinylnaphthalene, vinylpyridine, vinyl carbazole and the like; the alpha methylene carboxylic acid esters, nitriles, aldehydes and amides thereof such as acrylic acid, acrylamide, methyl acrylate, methyl methacrylate, methacryamide, acrolein, acrylonitrile, methacrylonitrile and the like. Where the latex is intended for paints, styrene and methyl methacrylate are preferred.

The copolymer latices may be intermixed with one or more additional synthetic polymer latexes; for example, a carboxylated high styrene-low butadiene copolymer latex may be blended with a polystyrene latex or a non-carboxylic butadiene-styrene latex. The latexes of the invention may be modified by incorporation of minor quantities of other film forming substances, preferably as aqueous dispersions, for example, polyvinyl chloride latex, emulsified alkyd resins, Vinsol emulsion (a thermoplastic resin derived from pine wood—Hercules Powder Co.), and melamine-formaldhyde or acrylic resins.

It is to be understood that various other modifications may be made without departing from the spirit of the invention, the scope of which is not limited to the detailed description herein set forth, but it is to be construed by the appended claims.

I claim:
1. A film-forming composition heat curable to a hard tack-free film comprising a latex of a carboxylated copolymer of a conjugated diene and a copolymerizable monoolefinic monomer, a primary metal drier in the form of a water soluble salt of a metal selected from the group consisting of copper, iron, vanadium, cobalt, manganese, and mixtures thereof, the metal of the primary drier being present in an amount not exceeding about 0.015% by weight based on said copolymer, and as a secondary curing agent for said carboxylated copolymer a water-soluble salt of a metal selected from the group consisting of zinc, magnesium, zirconium, cadmium, strontium, nickel and mixtures thereof.

2. A film-forming composition according to claim 1 in which the copolymer is a non-rubbery resinous carboxylated copolymer of butadiene and styrene.

3. A film-forming composition according to claim 2 in which the copolymer is a copolymer of butadiene, styrene, and a copolymerizable carboxylic acid.

4. A film-forming composition according to claim 1 in which the metal of the primary metal drier is present in the latex in chelated form.

5. A composition according to claim 4 in which the chelating agent for the primary metal drier is selected from the group consisting of amines and aminocarboxylic acids which are polydentate coordinators.

6. A latex paint for baked finishes comprising a dispersed pigment, a non-rubbery resinous copolymer of a conjugated diene, a copolymerizable carboxylic acid, and a copolymerizable monoolefinic comonomer free of carboxyl groups, a primary metal drier in the form of a water-soluble salt of a metal selected from the group consisting of copper, iron vanadium, cobalt, manganese and mixtures thereof, said metal of the drier being present in an amount not substantially in excess of 0.015% by weight based on said copolymer, and as a secondary curing agent for said carboxylic polymer, a water-soluble salt of a metal selected from the group consisting of zinc, magnenium, zirconium, cadmium, strontium, nickel and mixtures thereof.

7. A latex paint according to claim 6 in which the copolymer is a copolymer of butadiene, styrene and a copolymerizable carboxylic acid in which the styrene is the predominant component of the copolymer.

8. A composition according to claim 6 in which the metal of the primary drier is in chelated form.

9. A composition according to claim 8 in which the primary metal drier is chelated with a chelating agent selected from the group consisting of amines and aminocarboxylic acids which are polydentate coordinators.

References Cited in the file of this patent
UNITED STATES PATENTS

| | | |
|---|---|---|
| 2,880,186 | Barth | Mar. 31, 1959 |
| 2,880,189 | Miller et al. | Mar. 31, 1959 |
| 2,917,407 | Cipriano et al. | Dec. 15, 1959 |